UNITED STATES PATENT OFFICE.

ARVID NILSON, OF CHICAGO, ILLINOIS, ASSIGNOR TO WAHL-HENIUS INSTITUTE OF FERMENTOLOGY, OF CHICAGO, ILLINOIS, A CORPORATION OF ILLINOIS.

MANUFACTURE OF A FOOD PRODUCT FROM CEREAL-SPROUTS.

976,488.  Specification of Letters Patent.  Patented Nov. 22, 1910.

No Drawing.  Application filed September 13, 1909.  Serial No. 517,452.

*To all whom it may concern:*

Be it known that I, ARVID NILSON, a subject of the King of Sweden, residing at Chicago, in the county of Cook and State of Illinois, have invented a new and useful Improvement in the Manufacture of Food Products from Cereal-Sprouts, of which the following is a specification.

The object of my invention is to produce a new and improved food-product in the form of an extract of cereal sprouts of varieties containing bitter principle, which shall be palatable, and wholesome and nourishing to the human system.

As is well known, the rootlets and acrospires developed in those varieties of sprouting cereals, of which the sprouts contain bitter principle, contain also substances that, if adapted for use as food, whether in solid or beverage form, would be highly nourishing, stimulating and refreshing; and my invention involves a process of treating these sprouts, and particularly those derived from malt-growing, to produce therefrom such a food.

The sprouts most available for my purpose are those produced in the malt-growing industry, wherein they are regarded, practically, as a waste-product, though there is a market for them at a low price for use as cattle-feed; but because of the bitter principle they contain and of their consequent bitter taste cattle will only eat them sparingly and then when intermixed with other feed or fodder. This by-product of malting, however, constitutes about three per cent., by weight, of the entire quantity of malt manufactured, which in the United States alone amounts to upward of two and one-half billions of pounds, as the annual output, producing about seventy-five million pounds of sprouts from which to obtain the supplies for my purpose.

My treatment involves a method of neutralizing, and in that sense eliminating, the bitter principle in the rootlets referred to and preparing an extract therefrom of highly palatable quality affording a valuable food-product, rendered such by reason of large quantities of readily digestible carbohydrates as well as albuminoids and phosphates contained in the material treated.

To produce my improved product from malt-sprouts, as the preferred material, I make a mash of the sprouts with any suitable alkaline solution, such as lime or, and preferably, carbonate of soda, or of ammonia, using of the soda, in calcined condition, preferably about three to five per cent. in weight of the quantity of sprouts treated (or, any way, sufficient to make an adequately strong alkaline solution) and mashing the mixture at a temperature of from about 120° F. to about 212° F. for a prolonged period, from two to three hours being sufficient, until the action of the alkali has thoroughly neutralized the bitter principle and rendered the malt sweet and palatable. The liquor is run off from the mash and it is then concentrated, by boiling or otherwise, and may be clarified, as by sedimentation, filtration, or otherwise. The chemical action of the alkali is to render insoluble the sprout-bitter (bitter principle) and permit the same to precipitate in a state which makes its removal possible by subjecting the liquid to clarification.

The spent malt-sprouts which constitute the residue of the mash, being devoid of the objectionable bitter taste, afford a valuable by-product as a palatable and nourishing feed for animals.

The extract resulting from my aforesaid treatment has much the same composition as beef-extract, without however the objectionable qualities or properties of the latter due, primarily, to the presence in beef-extract of gelatinous and fatty substances as well as uric acid and other impurities resulting from retrogressive metabolism, and to objectionable odor.

While I prefer to extract the soluble constituents of the sprouts by the mashing procedure referred to, the same may be effected by any other suitable method of extraction with the use of water and an alkali.

An analysis of my improved product shows the following:

| | | |
|---|---|---|
| Albuminoids | 26.70 | per cent. |
| Sugar calculated as maltose | 21.00 | " " |
| Acid potassium phosphate | 4.61 | " " |
| Other mineral substances | 13.38 | " " |
| Free lactic acid | 0.90 | " " |
| Non-reducing nitrogen-free extract | 33.41 | " " |

My extract is adapted for use in the same ways and for the same purposes as ordinary beef-extract is commonly used. I also prepare it, however, for consumption as a beverage by diluting it with water and carbonating the liquor in a usual or any suitable manner, in which condition it is sparkling and effervescent and pleasant to the taste. To enhance the palatability of the beverage I subject the liquid before or without carbonating it, to acidulation, and preferably to lactic-acid acidulation by heating it to a temperature of about 50° C. (or within a range of about 46° C. to 55° C.) and maintaining it at that temperature for about forty-eight hours, more or less. Before or after fermentation the liquid may be evaporated to any desired degree of concentration to adapt it to be diluted for consumption. As will be understood, the temperature specified prevents development in the liquid of any other than the acidulating bacteria of lactic-acid, which may be supplied either by adding a suitable quantity of crushed malt (which always contains lactic-acid bacteria in profusion) in the liquid at that temperature or by exposing it to the atmosphere or, and preferably, a pure culture of lactic-acid bacteria. The lactic-acid acidulating process thus referred to is fully described in the co-pending application of Dr. Robert Wahl, Serial No. 517,465; filed September 13th, 1909.

What I claim as new and desire to secure by Letters Patent is—

1. The process of producing an extract from cereal sprouts or rootlets, containing bitter-taste producing constituents, which consists in treating the same to eliminate the bitter properties therefrom, extracting their soluble constituents, and separating the liquid from the insoluble matter.

2. The process of producing an extract from cereal sprouts or rootlets, containing bitter-taste producing constituents, which consists in treating the same to eliminate the bitter properties therefrom, extracting their soluble constituents, separating the liquid from the insoluble matter and concentrating such liquid.

3. The process of producing an extract from cereal sprouts or rootlets, containing bitter-taste producing constituents, which consists in treating the same to eliminate the bitter properties therefrom, extracting their soluble constituents, separating the liquid from the insoluble matter, and concentrating and acidulating such liquid.

4. The process of producing an extract from cereal sprouts or rootlets, containing bitter-taste-producing constituents, which consists in treating the same to eliminate the bitter properties therefrom, extracting their soluble constituents, separating the liquid from the insoluble matter, and concentrating, acidulating and carbonating such liquid.

5. The process of producing an extract from cereal sprouts or rootlets, containing bitter-taste-producing constituents, which consists in mashing and during the mashing subjecting the mass to the action of an alkaline solution to eliminate the bitter-taste producing constituents therefrom, separating the liquid from the mash, and concentrating the liquid.

6. The process of producing an extract from cereal sprouts or rootlets, containing bitter-taste producing constituents, which consists in mashing and during the mashing subjecting the mass to the action of an alkaline solution to eliminate the bitter-taste-producing constituents therefrom, separating the liquid from the mash, and acidulating and concentrating the liquid.

7. The herein described process of treating cereal sprouts or rootlets, containing bitter-principle, for the purpose set forth, which consists in mashing the same and eliminating their bitter-principle, by rendering insoluble and precipitating the same, separating the liquid from the mash and concentrating it, and subjecting the concentrated extract to lactic-acid fermentation to the practical exclusion of other fermentation.

8. The herein described process of treating cereal sprouts or rootlets, containing bitter-principle for the purpose set forth, which consists in mashing the same and in the maching step subjecting them to the action of an alkaline solution and thereby to eliminate their bitter principle, rendering insoluble and precipitating the same, separating the liquid from the mash and concentrating it, subjecting the concentrated extract to lactic-acid fermentation to the practical exclusion of other fermentation, and carbonating the resultant extract.

9. As a new article of manufacture, a palatable and nutritious extract from cereal sprouts or rootlets from which the bitter-taste-producing properties natural thereto have been eliminated.

10. As a new article of manufacture, a concentrated, palatable and nutritious extract from cereal sprouts or rootlets from which the bitter-taste-producing properties natural thereto have been eliminated.

11. As a new article of manufacture, a concentrated and acidulated, palatable and nutritious extract from cereal sprouts or rootlets from which the bitter-taste-producing properties natural thereto have been eliminated.

ARVID NILSON.

In presence of—
L. HEISLAR,
R. SCHAEFER.